(12) United States Patent
Oesterreicher et al.

(10) Patent No.: US 7,194,188 B2
(45) Date of Patent: Mar. 20, 2007

(54) SYSTEM AND METHOD FOR FACILITATING FAST-FORWARDING OF FIRST-RUN PROGRAMS

(76) Inventors: Richard T. Oesterreicher, 3871 Midshore Dr., Naples, FL (US) 34109; Craig Murphy, 7614 130th Ave., NE., Kirkland, WA (US) 98033

( * ) Notice: Subject to any disclaimer, the term of this patent is extended or adjusted under 35 U.S.C. 154(b) by 158 days.

(21) Appl. No.: 10/406,042

(22) Filed: Apr. 2, 2003

(65) Prior Publication Data

US 2004/0197072 A1    Oct. 7, 2004

(51) Int. Cl.
*H04N 5/783* (2006.01)
*H04N 5/781* (2006.01)
*H04N 7/173* (2006.01)

(52) U.S. Cl. .......................... 386/68; 386/125; 725/87; 725/88

(58) Field of Classification Search ................. 386/45, 386/68, 125, 126; 725/87, 88; *H04N 5/781, H04N 5/783, 7/173*
See application file for complete search history.

(56) References Cited

U.S. PATENT DOCUMENTS

| | | | |
|---|---|---|---|
| 4,506,387 A | | 3/1985 | Walter |
| 5,027,400 A | | 6/1991 | Baji et al. |
| 5,442,390 A | * | 8/1995 | Hooper et al. ................ 725/90 |
| 5,659,539 A | | 8/1997 | Porter et al. |
| 5,701,582 A | | 12/1997 | DeBey |
| 6,253,375 B1 | * | 6/2001 | Gordon et al. ................ 725/88 |
| 6,738,980 B2 | * | 5/2004 | Lin et al. ...................... 725/88 |
| 2001/0053277 A1 | | 12/2001 | Jun et al. |
| 2003/0093801 A1 | * | 5/2003 | Lin et al. ...................... 725/90 |
| 2003/0110504 A1 | * | 6/2003 | Plourde et al. ............... 725/89 |
| 2003/0208767 A1 | * | 11/2003 | Williamson et al. .......... 725/93 |
| 2004/0078829 A1 | * | 4/2004 | Patel et al. .................. 725/135 |

OTHER PUBLICATIONS

Prabhakaran et al., "High Throughput Data Transfers using the Tornado Transport Protocol".
Luby et al., "Practical Loss-Resilient Codes,"ITW, San Diego, CA, Feb. 8, 1998.
Luby et al., "Analysis of Low Density Codes and Improved Designs Using Irregular Graphs," 1997.
Grand National Press, "What is Video on Demand (VOD)?"<http://www.itvdictionary.com/vod.html>(visited Mar. 19, 2003).

* cited by examiner

*Primary Examiner*—Thai Tran
(74) *Attorney, Agent, or Firm*—Woodcock Washburn LLP

(57) ABSTRACT

A system and method are disclosed for facilitating fast-forwarding by viewers through a first-run program beyond the current broadcast point. In one embodiment, the first-run program is distributed before its scheduled publication time, and may be viewed at any time after the publication time. In a second embodiment, content is distributed on or after the publication time, but at a rate greater than the normal viewing rate. In a third embodiment, content is distributed on demand after the publication time by a media distribution server. In a fourth embodiment, a viewer participating in a multicast session of the content requests content beyond the current broadcast point. The viewer is switched to a unicast session, and the requested content is transmitted to the viewer. In alternative embodiments, a release code may be provided to control the time after which the viewer will be permitted to view program segments beyond the current broadcast point.

15 Claims, 7 Drawing Sheets

US 7,194,188 B2

SYSTEM AND METHOD FOR FACILITATING FAST-FORWARDING OF FIRST-RUN PROGRAMS

FIELD OF THE INVENTION

This invention relates to the field of digital media servers.

BACKGROUND OF THE INVENTION

First-run programs are pre-produced television programs initially broadcast by television stations owned or affiliated with a television network. Thus, for example, an episode of the popular television program ER$^{SM}$ is a first-run program when initially broadcast. By contrast, the film "Star Wars" is not a first-run program, even when first broadcast by a television station, since it was originally distributed in movie theaters. In addition, live programs such as live broadcasts of sporting events are not first-run programs since they are not pre-produced.

In the past, television viewers viewing a first-run program were unable to utilize advanced viewing features such as fast-forward, rewind, and slow motion, since the content of such programs was broadcast to viewers in "real-time," where each frame of video and audio is viewed by the user at the same instant that it is broadcast, except for any transmission delays. Unless otherwise specified, the term broadcast as used herein refers to a broadcast at the normal viewing rate. More recently, however, the advent of personal video recorders (PVRs) has made some of these advanced viewing features available to viewers.

PVRs record first-run and other programs as they are broadcast. PVRs also provide viewers with time-shifting features including pause, rewind, and fast-forward functions, but only with respect to content that has already been broadcast.

Both client-side (i.e., at the viewer's location) and server-side (i.e., at the broadcaster's location) PVRs have been implemented. Some client-side PVRs, such as those integrating TiVo and Replay TV services, record live incoming program feeds of any type onto a local hard drive at the viewer's location. Others, including ShowShifter and WinTV, enable viewers to record and play back television programs through video capture cards on their home computers.

Server-side PVRs are typically maintained by digital media service providers, such as cable operators, satellite providers, telephone companies, or Internet streaming service providers. In contrast to client-side PVRs, server-side PVRs share stored content between all viewers in a geographic region. Instead of gigabytes (tens of hours) of space on a single client-side device, server-side PVRs are capable of storing terabytes (tens of thousands of hours) of digital content in one location. Accordingly, server-side PVRs provide viewers with access to large content libraries.

Although existing PVR solutions have the ability to fast-forward, rewind, and pause the portion of a first-run program that has already been broadcast, they do not have the ability to fast-forward to a point in the program beyond the current broadcast point, i.e., the point in a first-run program that would currently be displayed on a television receiver if the program was viewed normally beginning at its scheduled publication time. Consequently, viewers wishing to fast-forward through commercials or portions of a program that are not of interest cannot watch the desired portion of the program until after a substantial portion of the program has been broadcast. This drawback of the prior art is illustrated in connection with FIGS. 1 and 2.

As shown in FIG. 1, first-run programs are typically sent via a plurality of transmission paths. More specifically, a source 110 transmits the program through a network broadcast operations center 120 via satellite 130 to a number of re-distributors 140–170, including direct-broadcast satellite (DBS) providers 140, network affiliates 150, cable television providers 160, and telephone companies 170. Each re-distributor 140–170 has some form of access into viewer homes and delivers the program via a suitable transport mechanism. For example, DBS providers 140 re-transmit the program over another satellite 145; network affiliates 150 broadcast from a terrestrial transmitter 155; cable television providers 160 distribute the signal using a hybrid fiber optic and coaxial cable network 165; and telephone companies 170 use a combination of fiber optic and twisted pair cables 175 (telephone lines) to distribute the program to the viewer. Each method of distribution may or may not require additional viewer-premises equipment 147, 157, 167, 177 for viewing the program on a television receiver 180.

FIGS. 2A–2D graphically illustrate the temporal relationship between the transmission and reception of an exemplary first-run program in the prior art. Each square in FIGS. 2A–2D represents an amount of time, t. The vertical line $T_{SB}$ represents the scheduled publication time for the first-run program, i.e., the time at which broadcast of the first-run program is to commence. The time period to the left of $T_{SB}$ is referred to herein as the pre-publication period, and the time period to the right is referred to herein as the post-publication period.

FIG. 2A illustrates an example of a first-run program comprising a plurality of segments A through E, having a duration of 5 t. It should be recognized that the division into five segments shown in FIG. 2A is purely exemplary. Each program may be conceptualized as comprising any number of segments N, each of time t, where N*t is the total program length. Thus, for example, a segment may be defined to represent 12 minutes of a program (as in the case of a one hour program divided into five segments such as segments A–E in FIG. 2A), one minute of a program, one second of a program, a single video frame of a program, or any other desired amount of a program.

The blocks in FIG. 2A indicate that the publisher (i.e., operator of network broadcast operation center 120) is in full possession of the program content at time ($T_{SB}$–t). As of that time, the program has not been transmitted or viewed since the current time has not yet reached $T_{SB}$.

Once $T_{SB}$ is reached, publication of the program commences. In each time interval, a program segment of duration t is broadcast to the receiver, as indicated in FIG. 2B by the bold segment lettering in the lower row.

As content is broadcast, it is displayed by the receiver, as shown in FIG. 2C. This sequence continues until the end of the program. Since segment A is not stored by the receiver, it no longer appears on the lower row. Segments C through E also do not appear on the lower row since they have not yet been broadcast. Consequently, the viewer cannot fast-forward or rewind the program because the television receiver does not store broadcast content but simply displays such content as it is received.

A PVR device provides the user with additional functions by recording previously broadcast segments. More specifically, as shown in FIG. 2D, the PVR recording provides the ability to time-shift program content so that the user may pause, rewind, and fast-forward, but only within the scope of content that has already been broadcast. Thus, in FIG. 2D, since segments C through E have not yet been broadcast, the PVR cannot fast-forward beyond the end of segment B.

SUMMARY OF THE INVENTION

A system and method are disclosed that allow viewers to fast forward beyond the current broadcast point of a first-run program.

In one aspect, the present invention is directed to a method of distributing first-run programming content to a viewer, comprising: digitally encoding first-run programming content having a scheduled publication time, the first-run programming content comprising a plurality of segments, each segment having a segment publication time; loading the digitally encoded content onto a media distribution server; transmitting the content to a recording device at the viewer's location prior to the publication time; selecting by the viewer a desired segment for viewing, said desired segment being beyond the current broadcast point; and viewing the desired segment on a display after the scheduled publication time and before the segment publication time.

In another aspect of the present invention, the method further comprises receiving a release code which permits said viewing.

In another aspect, the present invention is directed to a system for distributing first-run programming content to a viewer, comprising: a media distribution server adapted to store digitally-encoded first-run programming content having a scheduled publication time, the first-run programming content comprising a plurality of segments, each segment having a segment publication time, the server further adapted to transmit the content; a recording device at a viewer's location adapted to receive said segments and select a desired segment for viewing, said desired segment being beyond the current broadcast point; and a display for viewing the desired segment after the scheduled publication time and before the segment publication time.

In another aspect of the present invention, the recording device is further adapted to receive a release code which permits said viewing.

In another aspect, the present invention is directed to a system for distributing first-run programming content to a viewer, comprising: a media distribution server adapted to store digitally-encoded first-run programming content having a scheduled publication time, the first-run programming content comprising a plurality of segments, each segment having a segment publication time, the server further adapted to transmit the content; a recording device at a viewer's location adapted to receive said segments and select a desired segment for viewing, said desired segment being beyond the current broadcast point; and a display for viewing the desired segment after receiving a release code which permits said viewing.

In another aspect, the present invention is directed to a method of distributing first-run programming content to a viewer, comprising: digitally encoding first-run programming content having a scheduled publication time; loading the digitally encoded content onto a media distribution server; digitally transmitting the content at or after the publication time at a rate greater than the normal viewing rate; the viewer selecting desired program content for viewing, said desired program content being beyond the current broadcast point; and viewing the desired program content on a display.

In another aspect of the present invention, the method further comprises receiving a release code which permits said viewing.

In another aspect, the present invention is directed to a method of distributing first-run programming content to a viewer, comprising: digitally encoding first-run programming content having a scheduled publication time; loading the digitally encoded content onto a media distribution server; a viewer requesting transmission of desired content from the first-run programming content, said desired content being beyond the current broadcast point; digitally broadcasting the desired content on or after the publication time; and viewing the desired content on a display.

In another aspect of the present invention, the method further comprises receiving a release code to permit said broadcasting and viewing.

In another aspect, the present invention is directed to a method of distributing first-run programming content to a viewer, comprising: digitally encoding first-run programming content having a scheduled publication time; loading the digitally encoded content on to a media distribution server; digitally multicasting the content at the publication time at the normal viewing rate; receiving a request from a viewer for program content beyond the current broadcast point; transferring the viewer from the multicasting to a unicast session; digitally transmitting the content in the unicast session; and viewing the desired program content on a display.

In another aspect of the present invention, the step of digitally transmitting further comprises transmitting the content at a rate greater than the normal viewing rate.

In another aspect of the present invention, the step of digitally transmitting further comprises transmitting the content at a rate equal to a requested fast-forwarding rate.

In another aspect of the present invention, the method further comprises receiving a release code to permit said transferring, digitally transmitting, and viewing.

DESCRIPTION OF THE PREFERRED EMBODIMENTS

Figure 1:
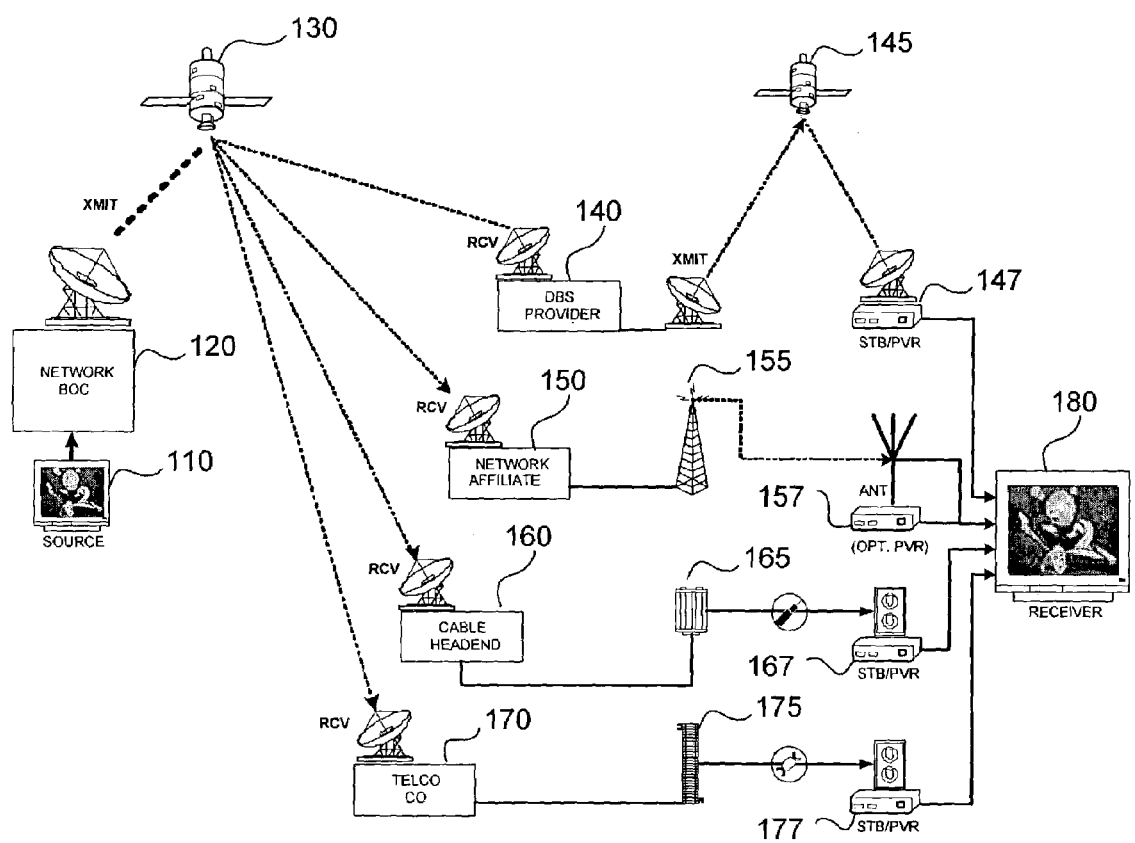
FIG. 1 is a block diagram that illustrates distribution paths for a first-run program.
Figure 2A:
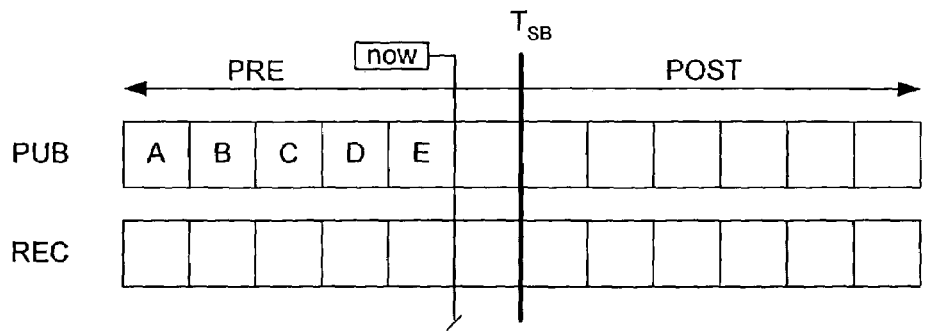
FIG. 2A is a temporal diagram that illustrates a first-run program before broadcast in the prior art.
Figure 2B:
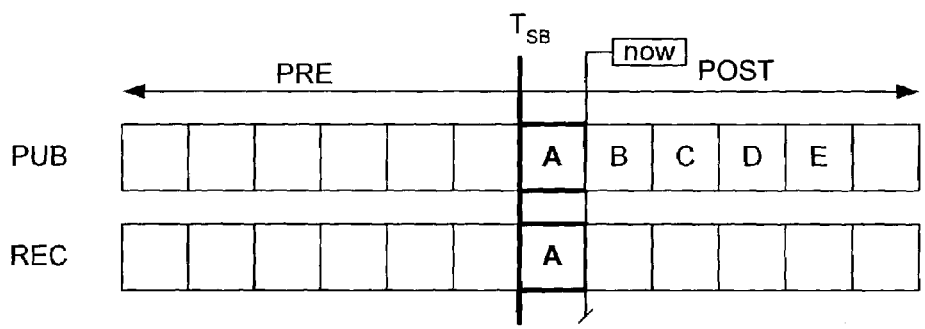
FIG. 2B is a temporal diagram that illustrates publication and viewing of a first-run program in the prior art.
Figure 2C:
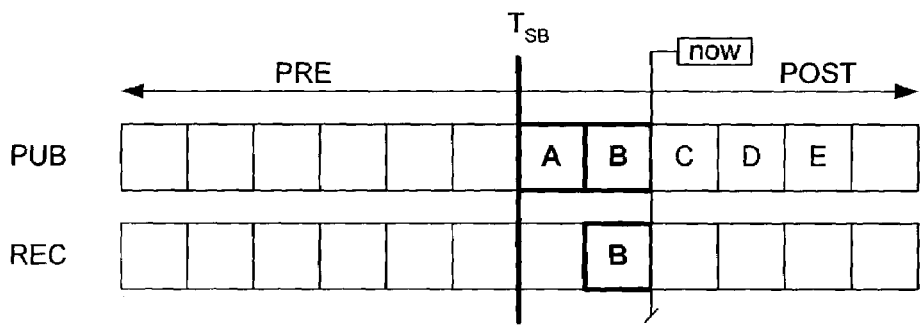
FIG. 2C is a temporal diagram that further illustrates publication and viewing of a first-run program in the prior art.
Figure 2D:
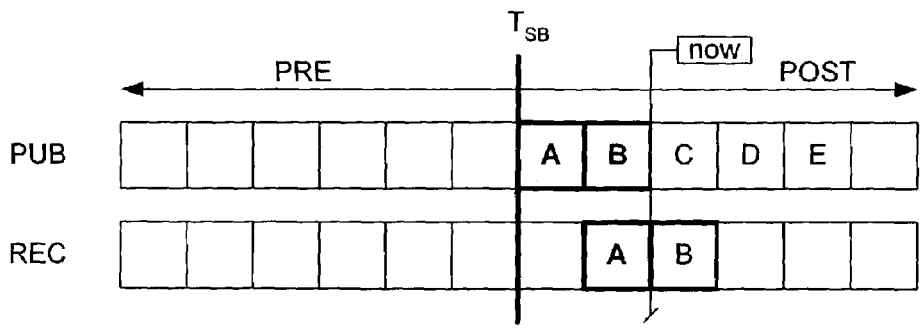
FIG. 2D is a temporal diagram that illustrates recording and later viewing of a first-run program in the prior art.
Figure 3:
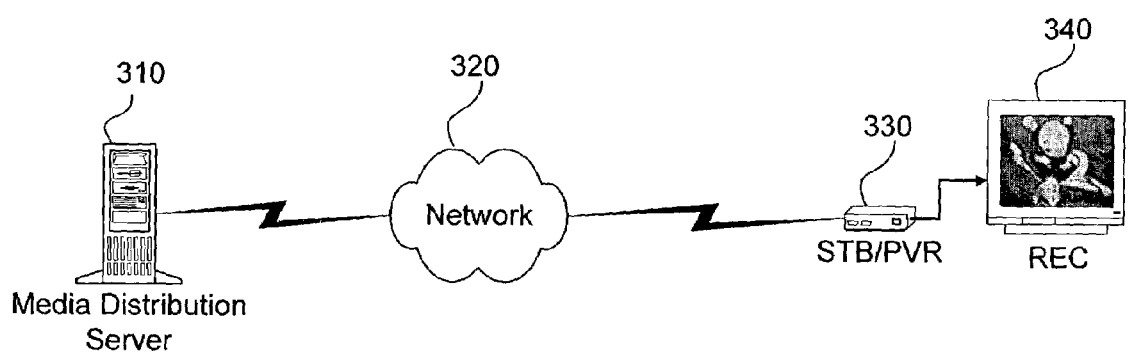
FIG. 3 is a block diagram that illustrates a preferred embodiment of the present system.

A preferred embodiment for implementing the present system and method is described in connection with FIG. 3. As shown in FIG. 3, a media distribution server 310 is preferably provided for storing digitally-encoded first-run programs. Media distribution server 310 may, for example, be a video-on-demand server.

Media distribution server 310 is preferably adapted to transmit content across a communications network 320 to a set-top box 330. Set-top box 330 supplies received content to receiver 340 so that it may be viewed. Set top-box 330 is preferably provided with PVR capability.

Figure 4:
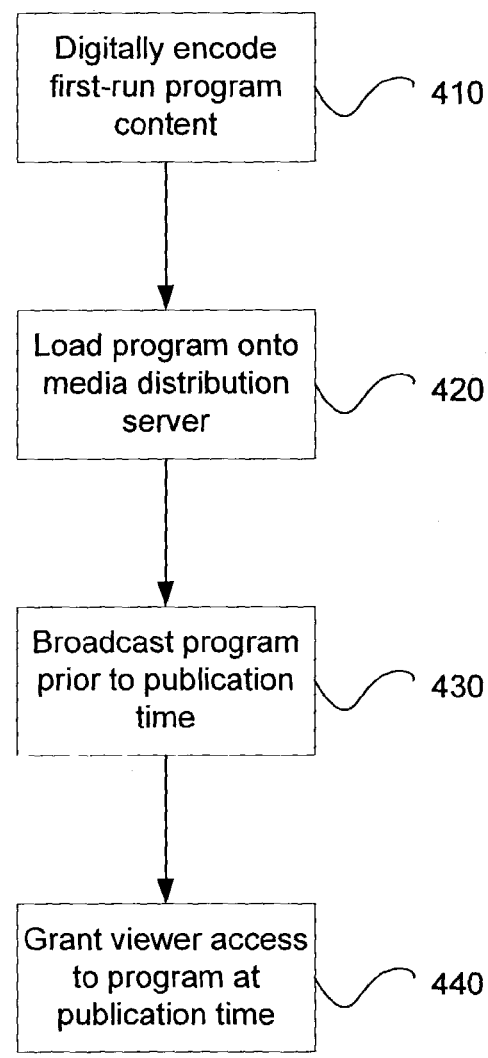
FIG. 4 is a flow chart that illustrates one preferred embodiment for distributing first-run programs.

FIG. 4 is a flow chart that illustrates one preferred embodiment for distributing first-run programs. As shown in FIG. 4, in step 410, a first-run program is digitally encoded. In step 420, the program is loaded onto media distribution server 310. In step 430, the entire program is digitally broadcast or otherwise transmitted to the viewer's premises prior to the scheduled publication time $T_{SB}$. In a preferred embodiment, set-top box 330 is preferably adapted to block viewer access to the stored first-run program content before $T_{SB}$. In step 440, the viewer submits a request for a segment of the first-run program beyond the current broadcast point. In one preferred embodiment, the request may be a request to fast forward the program ("fast-forward" request). Alternatively, the request may be to jump to a specified time point in the program ("random-access" request). In step 450, on or after the publication time has been reached, set-top box 330 displays the requested segment of the first-run program on receiver 340. Because set-top box 330 has recorded the entire program prior to the scheduled publication time $T_{SB}$, it can thus permit the viewer to fast-forward or access any point in the first-run program.

Figure 5:
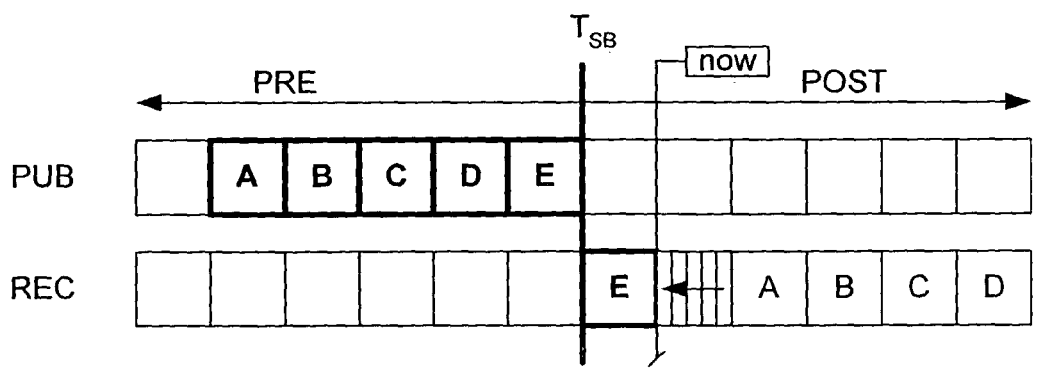
FIG. 5 is a temporal diagram that further illustrates the preferred embodiment of FIG. 4.

FIG. 5 is a temporal diagram further illustrating this preferred embodiment and one exemplary viewing scenario that it makes possible. As shown in FIG. 5, all program segments A–E are broadcast or otherwise transmitted to set-top box 330 prior to time $T_{SB}$. The viewer may then, for example, view the last segment of the program (segment E) immediately following $T_{SB}$. After viewing segment E, the viewer may rewind the program and view the remainder of the program beginning with the first segment (segment A).

In an alternative preferred embodiment, a release code may be provided to the set-top box to control the time after which the viewer will be permitted to view program segments beyond the current broadcast point. More specifically, set-top box 330 may be adapted to respond to viewer requests for program segments beyond the current broadcast point only after it receives an appropriate release code authorizing it to do so. This code may, for example, be embedded in the broadcast version of the program or separately transmitted to the media distribution server for forwarding to the set-top box. Alternatively, the release code may be sent directly to the set-top box.

Figure 6:
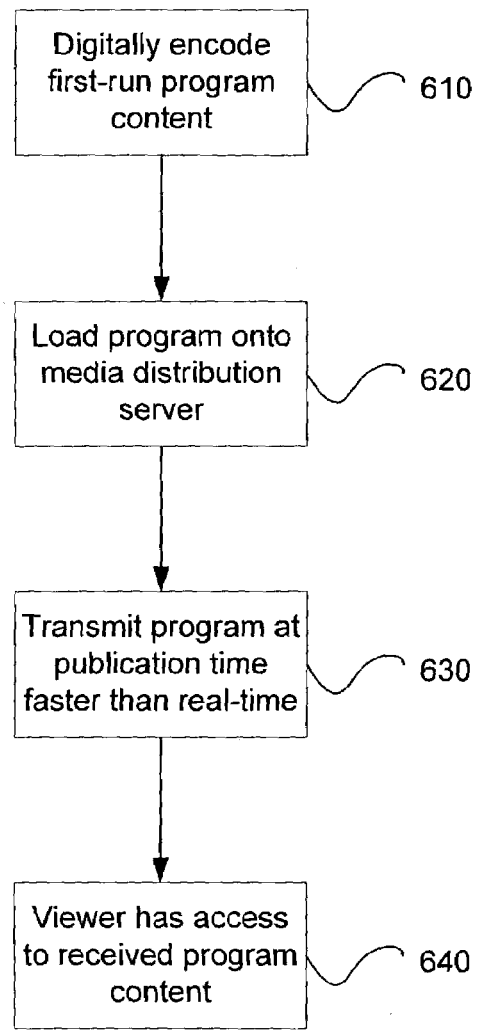
FIG. 6 is a flow chart that illustrates a second preferred embodiment for distributing first-run programs.

FIG. 6 illustrates an alternative preferred embodiment for distributing first-run programs. In this preferred embodiment, media distribution server 310 is adapted to transmit the program at a rate faster than the normal viewing rate. Set-top box 330 is adapted to receive the program at the transmitted rate and to record the received transmission. More specifically, in step 610, a first-run program is digitally encoded. In step 620, the program is loaded onto media distribution server 310. At time $T_{SB}$, the program is broadcast or otherwise transmitted to set-top box 330, but at a rate greater than the normal viewing rate (step 630). In step 640, the viewer requests a segment of the first-run program which has already been transmitted to set-top box 330, but is beyond the current broadcast point. In step 650, set-top box 330 displays the requested segment of the first run programs on receiver 340.

Figure 7:
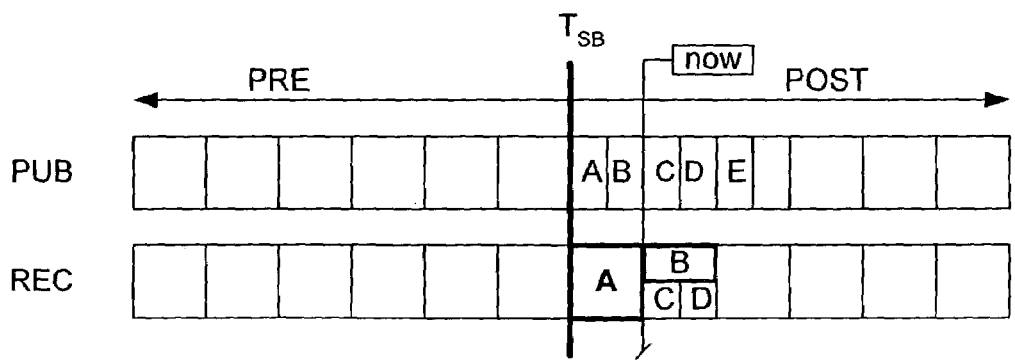
FIG. 7 is a temporal diagram that further illustrates the preferred embodiment of FIG. 6.

FIG. 7 is a temporal diagram that further illustrates this preferred embodiment and one exemplary viewing scenario that it makes possible. As shown in FIG. 7, program segments are transmitted to the viewer at a rate greater than the normal viewing rate. Thus, for example, segments A and B may preferably be transmitted in a time t, the normal broadcast time for a single segment. Using set-top box 330, the viewer can access any program segment, or portion thereof, that has been received. More specifically, in the exemplary scenario of FIG. 7, by time ($T_{SB}$+t), set-top box 330 has received segments A through B of the program, and can fast-forward through the end of segment B. Moreover, if the viewer watches segment B at normal speed beginning at time ($T_{SB}$+t), set-top box 330 will receive segments C and D by the time viewing of segment B is complete. The viewer can then fast forward through segments C and D of the program or randomly access any point in those segments. Finally, the viewer can fast forward through the program at a fast forwarding rate less than or equal to the transmission rate at any time after $T_{SB}$.

Figure 8:
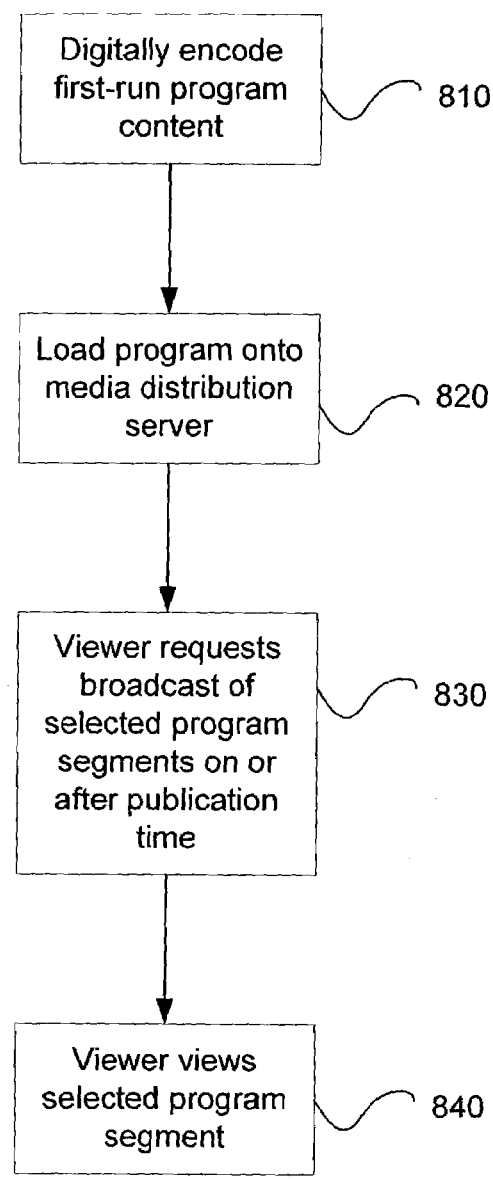
FIG. 8 is a flow chart that illustrates a third preferred embodiment for distributing first-run programs.

FIG. 8 illustrates another alternative preferred embodiment for distributing first-run programs. In this preferred embodiment, media distribution server 310 is adapted to act as a server-side PVR, supplying first-run program content as demanded. In a preferred embodiment, media distribution server 310 may be adapted to supply first-run program content only after the scheduled publication time $T_{SB}$. In this embodiment, set-top box 330 need not have PVR capability.

More specifically, in step 810, a first-run program is digitally encoded. In step 820, the program is loaded onto media distribution server 310. In step 830, the viewer requests a segment of the first-run program beyond the current broadcast point. In a preferred embodiment, the server is adapted to respond to the viewer's request only after $T_{SB}$ has been reached. In step 840, the requested segment is broadcast or otherwise transmitted to set-top box 330 and displayed for the viewer.

In a preferred embodiment, a release code transmitted to the media distribution server may also be used to control the point at which the media distribution server will transmit program segments beyond the current broadcast point. More specifically, the media distribution server may be adapted to respond to viewer requests for program segments beyond the current broadcast point only after it receives an appropriate release code authorizing it to do so. This code may, for example, be embedded in the broadcast version of the program or separately transmitted to the media distribution server at some time after the scheduled publication time. Thus, a release code may be used to control the point at which the viewer will be permitted to view a segment of the program beyond the current broadcast point.

Figure 9:
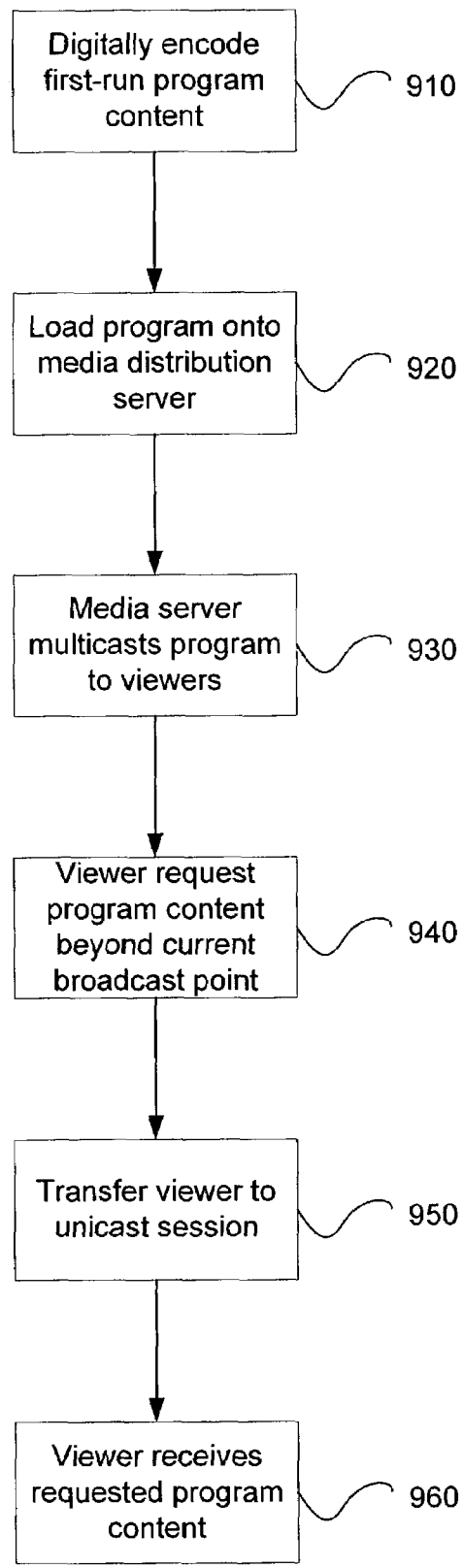
FIG. 9 is a flow chart that illustrates a fourth preferred embodiment for distributing first-run programs.

FIG. 9 illustrates another preferred embodiment for distributing first-run programs. More specifically, in step 910, a first-run program is digitally encoded. In step 920, the program is loaded onto media distribution server 310. In step 930, at time $T_{SB}$, media distribution server 310 multicasts the program to more than one viewer's set-top box 330. Next in step 940, a viewer requests fast forwarding or random access to a segment in the first run program beyond the current broadcast point. In step 950, media distribution server 310 seamlessly transfers the viewer's set-top box 330 from the multicast session to a unicast session, and then transmits the requested segments of the program to set-top box 330. In an alternative embodiment, the transmission is at a rate greater than the normal viewing rate. In another alternative embodiment, the transmission rate is equal to the requested fast-forwarding rate. In step 960, set-top box 330 displays the requested segments of the first run program on receiver 340.

In a preferred embodiment, release codes transmitted to the media distribution server may also be used to control the point at which the media distribution server will unicast the program. More specifically, the media distribution server may be adapted to respond to viewer requests for program segments beyond the current broadcast point only after it receives an appropriate release code authorizing it to do so. This code may, for example, be embedded in the broadcast version of the program or separately transmitted to the media distribution server at some time after the scheduled publication time. Thus, a release code may be used to control the point at which the viewer will be permitted to view a segment of the program beyond the current broadcast point.

While the invention has been described in conjunction with specific embodiments, it is evident that numerous alternatives, modifications, and variations will be apparent to those persons skilled in the art in light of the foregoing description.

What is claimed is:

1. A method of distributing first-run programming content to a viewer, wherein said first-run programming content comprises at least a portion of a pre-produced program that is not generally publicly available for viewing until a scheduled publication time, said method comprising:
   digitally encoding first-run programming content having a scheduled publication time, the first-run programming content comprising a plurality of segments, each segment having a segment publication time;
   loading the digitally encoded first-run programming content onto a media distribution server;
   transmitting the digitally encoded first-run programming content to a recording device at the viewer's location prior to the publication time;
   selecting by the viewer a desired segment for viewing, said desired segment being beyond the current broadcast point; and
   viewing the desired segment on a display after the scheduled publication time and before the segment publication time.

2. The method of claim 1, further comprising receiving a release code which permits said viewing.

3. A system for distributing first-run programming content to a viewer, wherein said first-run programming content comprises at least a portion of a pre-produced program that is not generally publicly available for viewing until a scheduled publication time, said system comprising:
   a media distribution server adapted to store digitally-encoded first-run programming content having a scheduled publication time, the digitally encoded first-run programming content comprising a plurality of segments, each segment having a segment publication time, the server further adapted to transmit the digitally encoded first-run programming content;
   a recording device at a viewer's location adapted to receive said segments and select a desired segment for viewing, said desired segment being beyond a current broadcast point after the scheduled publication time and before the segment publication time; and
   a display for viewing the desired segment.

4. The system of claim 3, wherein said recording device is further adapted to receive a release code which permits said viewing.

5. A system for distributing first-run programming content to a viewer, wherein said first-run programming content comprises at least a portion of a pre-produced program that is not generally publicly available for viewing until a scheduled publication time, said system comprising:
   a media distribution server adapted to store digitally encoded first-run programming content having a scheduled publication time, the digitally encoded first-run programming content comprising a plurality of segments, each segment having a segment publication time, the server further adapted to transmit the digitally encoded first-run programming content;
   a recording device at a viewer's location adapted to receive said segments and select a desired segment for viewing, said desired segment being beyond a current broadcast point, wherein said recording device further adapted to permit viewing the desired segment after receiving a release code, wherein said release code permits said viewing, after the scheduled publication time.

6. A method of distributing first-run programming content to a viewer, wherein said first-run programming content comprises at least a portion of a pre-produced program that is not generally publicly available for viewing until a scheduled publication time, said method comprising;
   digitally encoding first-run programming content having a scheduled publication time;
   loading the digitally encoded first-run programming content onto a media distribution server;
   digitally transmitting the digitally encoded first-run programming content at or after the publication time at a rate greater than a normal viewing rate;
   the viewer selecting desired program content for viewing, said desired program content being beyond a current broadcast point; and
   viewing the desired program content on a display at the normal viewing rate while digitally transmitting said digitally encoded first-run programming content.

7. The method of claim 6, further comprising receiving a release code which permits said viewing.

8. A method of distributing first-run programming content to a viewer, wherein said first-run programming content comprises at least a portion of a pre-produced program that is not generally publicly available for viewing until a scheduled publication time, said method comprising:
   digitally encoding first-run programming content having a scheduled publication time;
   loading the digitally encoded first-run programming content onto a media distribution server;
   a viewer requesting transmission of desired content from the digitally encoded first-run programming content, said desired content being beyond the current broadcast point;
   digitally broadcasting the desired content on or after the publication time; and
   viewing the desired content on a display.

9. The method of claim 8, further comprising receiving a release code to permit said broadcasting and viewing.

10. A method of distributing first run programming content to a viewer, wherein said first-run programming content comprises at least a portion of a pre-produced program that is not generally publicly available for viewing until a scheduled publication time, said method comprising:

digitally encoding first-run programming content having a scheduled publication time;

loading the digitally encoded first-run programming content onto a media distribution server;

digitally transmitting the digitally encoded first-run programming content at a rate greater than a normal viewing rate while viewing the content at the normal viewing rate.

11. The method of claim 10, further comprising selecting by the viewer a desired segment for viewing, said desired segment being beyond a current broadcast point.

12. The method of claim 10, the digitally encoded first-run programming content comprising a plurality of segments, each segment having a segment publication time.

13. The method of claim 12, further comprising viewing a desired segment after the scheduled publication time but before the segment publication time.

14. The method of claim 13, further comprising receiving a release code to permit said digitally transmitting.

15. The method of claim 10, further comprising receiving a release code to permit viewing.

* * * * *